US006850386B2

(12) United States Patent
Kovinskaya et al.

(10) Patent No.: US 6,850,386 B2
(45) Date of Patent: Feb. 1, 2005

(54) CONTROL OBJECT POSITIONING USING AN OPTIMUM JERK PROFILE TO REDUCE EXCITATION OF MECHANICAL RESONANCES

(75) Inventors: Svetlana I. Kovinskaya, Edmond, OK (US); Roy L. Wood, Yukon, OK (US); Evert S. Cooper, Morgan Hill, CA (US)

(73) Assignee: Seagate Technology LLC, Scotts Valley, CA (US)

(*) Notice: Subject to any disclaimer, the term of this patent is extended or adjusted under 35 U.S.C. 154(b) by 411 days.

(21) Appl. No.: 10/121,905

(22) Filed: Apr. 11, 2002

(65) Prior Publication Data

US 2003/0067710 A1 Apr. 10, 2003

Related U.S. Application Data

(60) Provisional application No. 60/306,330, filed on Jul. 18, 2001, and provisional application No. 60/306,343, filed on Jul. 18, 2001.

(51) Int. Cl.[7] .............................................. G11B 5/596
(52) U.S. Cl. .............................. 360/78.06; 360/78.07
(58) Field of Search ............................. 360/75, 78.01, 360/78.04, 78.06, 78.07, 78.08, 78.12; 318/443, 560, 571

(56) References Cited

U.S. PATENT DOCUMENTS

| 5,229,896 A | * | 7/1993 | Tohyama et al. ........ 360/78.07 |
| 5,668,680 A | | 9/1997 | Tremaine |
| 5,901,009 A | | 5/1999 | Sri-Jayantha et al. |
| 6,002,971 A | | 12/1999 | Lucas |
| 6,011,373 A | | 1/2000 | McConnell et al. |
| 6,114,825 A | | 9/2000 | Katz |
| 6,148,240 A | | 11/2000 | Wang et al. |
| 6,256,163 B1 | | 7/2001 | Schmidt et al. |
| 6,294,891 B1 | | 9/2001 | McConnell et al. |
| 6,320,345 B1 | | 11/2001 | Yuan et al. |
| 6,560,059 B1 | * | 5/2003 | Hsin et al. ............... 360/78.04 |
| 2001/0006438 A1 | * | 7/2001 | Nakagawa et al. ...... 360/78.09 |

OTHER PUBLICATIONS

Y. Mizoshita, S. Hasegawa, and K. Takaishi; Vibration Minimized Access Control For Disk Drives; *IEEE Transactions on Magnetics*; May, 1996; pp. 1793–1798; vol. 32, No. 3.

* cited by examiner

*Primary Examiner*—Andrew L. Sniezek
(74) *Attorney, Agent, or Firm*—Fellers, Snider, et al.

(57) ABSTRACT

A method for positioning a control object using an optimum jerk profile to reduce excitation of mechanical resonances. A base set of control profiles is selected to describe jerk, acceleration, velocity and displacement of the control object during a seek. Notch functions are applied to the base jerk profile to provide a modified jerk profile having a value of zero at selected times during which maximum current is to be applied to move the control object. Normalized control profiles describing acceleration, velocity and displacement are generated from the modified jerk profile and thereafter used to move the control object. To suppress specific resonant frequencies of interest, the elapsed time of the seek is selected to coincide with a time at which a combination of the excitation energies associated with the resonant frequencies is at a minimum.

17 Claims, 7 Drawing Sheets

CONTROL OBJECT POSITIONING USING AN OPTIMUM JERK PROFILE TO REDUCE EXCITATION OF MECHANICAL RESONANCES

RELATED APPLICATIONS

This application claims priority to U.S. Provisional Application No. 60/306,330 filed Jul. 18, 2001 and U.S. Provisional Application No. 60/306,343 filed Jul. 18, 2001.

FIELD OF THE INVENTION

The claimed invention relates generally to the positioning of control objects, and more particularly, but not by way of limitation, to a disc drive servo control system that moves a data transducing head adjacent a data recording surface in relation to an optimized jerk profile to reduce excitation of mechanical resonances in an actuator structure used to support the head.

BACKGROUND

Disc drive data handling devices are commonly used as the primary data storage and retrieval devices in modem computer systems. In a typical disc drive, data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A digital servo system is typically used to control the position of the heads relative to tracks on the discs. The tracks are defined from servo data written to the surfaces of the discs during manufacturing. The servo system utilizes the servo data in the performance of two primary operations: seeking and track following.

Seeking entails the movement of a selected head from an initial track to a destination track. Current is applied to an actuator coil to initially accelerate and then decelerate the head to bring the head to rest upon the destination track. In one approach, the velocity of the head is repetitively determined and compared to a velocity profile which defines an optimum velocity trajectory for the head as it moves to the target track. The amount of current applied to an actuator coil varies in proportion to the velocity error. In another approach, current is applied directly to the coil in accordance with a predetermined current or source voltage profile appropriate for the length of the seek. In either case, once the head reaches the destination track the servo system transitions to a track-follow mode wherein the head is maintained over the destination track until the next seek command is executed.

Since user data are only typically transferred to the host device during track following modes of operation, efforts are made by disc drive designers to minimize the time required to carry out seek operations in order to maximize overall data transfer performance. Actuators are typically abruptly accelerated and decelerated to bring the head into alignment with the destination track in as short a time as practical. However, such abrupt forces upon the actuator can excite resonances of the mechanical actuator system, causing the head to oscillate (ring) upon arrival to the destination track. Such oscillations can significantly lengthen the time required to complete the seek and transition to the track following mode.

Designers have employed various techniques to select trajectory control profiles (velocity, current, etc.) having shapes that reduce the excitation of such resonances. One approach discussed by Mizoshita et al. in a paper entitled "Vibration Minimized Access Control for Disk Drives," IEEE Transactions on Magnetics, Vol. 32, No. 3, May 1996, uses a minimum-jerk cost function to develop a closed-loop velocity profile to move a disc drive actuator arm. As will be recognized, jerk is defined as change in acceleration (force) with respect to time.

While operable, the system of Mizoshita has certain drawbacks, including inadequate compensation for certain real world effects such as coil inductance and back electromagnetic force (bemf) in the actuator coil. These factors mitigate against using the derived profiles in an open loop fashion; applying current from a voltage source in accordance with the derived current profile would not likely provide the necessary current within the coil to achieve the desired final states for the seek (correct final position, velocity and acceleration of zero, etc.). Using this methodology in a closed-loop fashion may also result in less than optimum performance; applying whatever current is necessary to cause the head to follow the derived velocity profile might provide different jerk characteristics than those predicted by the model due to the effects of bemf and coil inductance.

Mizoshita's cost function is expressed in terms of the integral of the square of the jerk profile values, and thus attempts to minimize the area of the jerk profile. While this tends to reduce excitation of all mechanical resonances of the system across the board, there is no provision to further address and suppress the excitation of specific resonant frequencies of the mechanical system identified as potentially having an adverse effect upon the operation of the servo system. Thus, even using Mizoshita's jerk profile such resonances can still be excited during a seek, increasing the time required to complete the settling of the head onto the destination track.

Accordingly, there is a continued need for improvements in the art to provide control profiles to facilitate positional control of a control object such as a disc drive actuator. It is to such improvements that the claimed invention is directed.

SUMMARY OF THE INVENTION

The present invention (as embodied herein and as claimed below) is directed to a method for positioning a control object, such as a data transducing head in a disc drive data handling device.

In accordance with preferred embodiments, a base series of control profiles is selected to describe jerk, acceleration, velocity and displacement of the control object from an initial position to a final position along an initial trajectory path. The base control profiles include a continuous base jerk profile configured to suppress excitation of mechanical resonances in the control object through selection of minimum peak values in the profile.

At least one notch function is applied to the base jerk profile to provide a modified jerk profile having a value of zero at selected times during which maximum current is to be applied to control the trajectory of the control object. The modified jerk profile is used to provide a normalized series of control profiles that describe acceleration, velocity and displacement of the control object from the initial position to the final position along a new trajectory path that achieves faster access as compared to the initial trajectory path. Thereafter, seek operations are performed to displace the control object in relation to the normalized series of control profiles.

Preferably, the base jerk profile is further configured to account for back electromagnetic force (bemf) generated during displacement of the control object. The base jerk profile is preferably expressed as a second order polynomial $At^2+Bt+C$ where t represents elapsed time and coefficients A, B and C are determined in relation to desired initial and final states of the control object.

The notch function is preferably characterized as a function W(t) and the modified jerk profile is expressed as a relationship $(At^2+Bt+C)(W(t))$. A preferred form for W(t) is in accordance with the relationship $1-e^{(-n(t-t^*))^{2m}}$ where t* is a location of a notch provided in the modified jerk profile by the notch function so that the modified jerk profile has a zero value at locations near t*, and where n and m are constants that determine length and shape of the notch about t*. Additional functions W(t) can be advantageously added to provide additional notches to the modified jerk profile as desired.

The normalized control profiles are preferably used to control the displacement of the control object by identifying a number of resonant frequencies of the control object, and evaluating the excitation energy of each of the number of resonant frequencies for a sequence of different seek operations carried out using the normalized series of control profiles and having different elapsed time durations. A time scale value is selected as a time at which a combination of the excitation energies of each of the number of resonant frequencies is below a selected threshold, and a seek operation is performed to move the control object from the initial position to the target position so that the elapsed time during the seek operation is nominally equal to the time scale value.

These and various other features and advantages which characterize the claimed invention will be apparent upon reading the following detailed description and upon review of the associated drawings.

DETAILED DESCRIPTION

Figure 1:
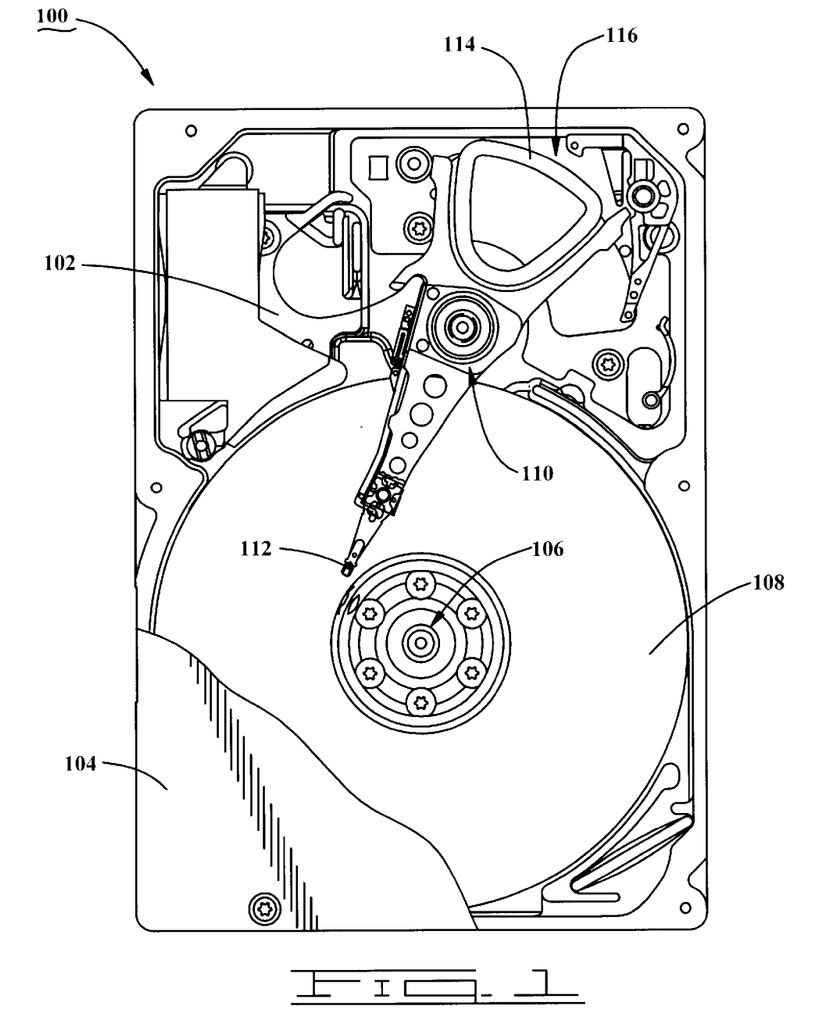
FIG. 1 is a plan view of a disc drive data handling device constructed and operated in accordance with preferred embodiments of the present invention.

To provide an exemplary environment in which preferred embodiments of the present invention can be advantageously practiced, FIG. 1 provides a top plan view of a disc drive data handling device 100 of the type used to store and retrieve computerized data. The disc drive 100 includes a rigid base deck 102 which cooperates with a top cover 104 (shown in partial cutaway) to form a sealed housing for the drive. Electrical communication and control electronics are provided on a disc drive printed circuit board (PCB) affixed to the underside of the base deck 102 (and hence, not visible in FIG. 1).

A spindle motor 106 rotates a number of rigid data recording discs 108 at a constant high speed. A rotary actuator 110 is positioned adjacent the discs 108 and supports a corresponding array of read/write data transducing head 112. The actuator 110 is rotated through application of current to an actuator coil 114 of a voice coil motor (VCM) 116.

Figure 2:
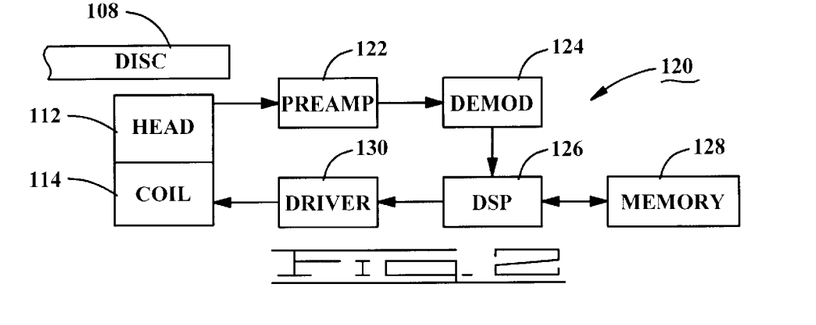
FIG. 2 is a functional block diagram of a servo control circuit of the disc drive of FIG. 1.

FIG. 2 provides a functional block diagram of a servo control circuit 120 of the disc drive 100. Servo data written to the disc surfaces are transduced by the selected head 112 and provided to a preamplifier/driver circuit (preamp) 122 for preamplification and filtering. The filtered servo signals are provided to demodulation circuitry (demod) 124 which applies additional conditioning to the signals, including conversion to digital form. The digital servo signals are then passed to a programmable processor 126, in this case a digital signal processor (DSP) having associated memory 128.

The DSP 126 generates an appropriate command signal to adjust the position of the selected head 112 in accordance with the detected position of the head from the servo data as well as commands received from a top level processor (not shown). The DSP 126 provides this command signal to coil driver circuitry 130 which in turn applies current to the actuator coil 114 to move the head 112 as desired.

Figure 3:
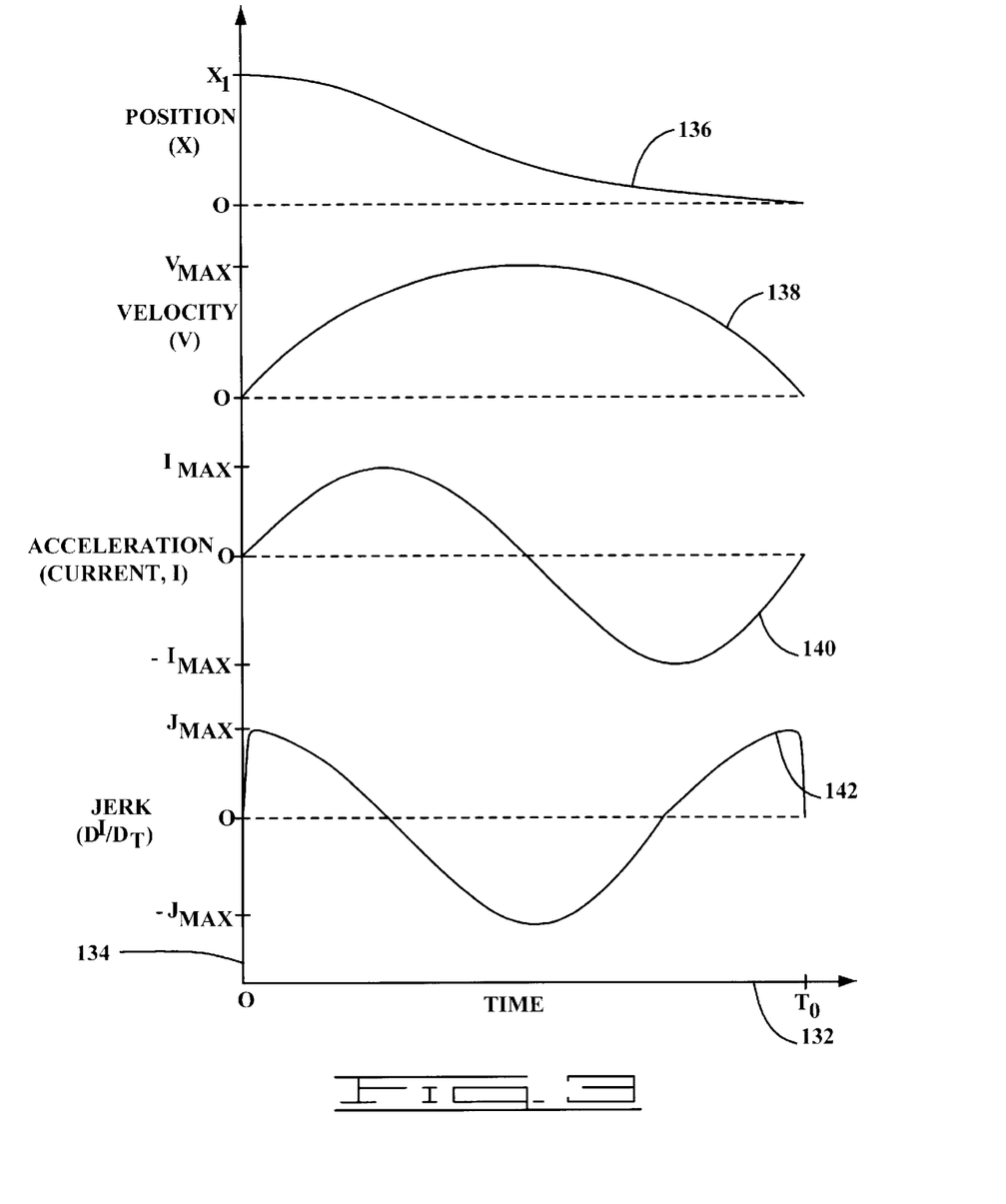
FIG. 3 is a series of control profiles that generally describe jerk, acceleration (force), velocity and displacement of a head of the disc drive during a seek.

FIG. 3 provides a generalized family of profiles to describe the operation of the servo control circuit 120 during a seek operation in which the selected head 112 is moved from an initial track to a destination (target) track. The profiles are plotted against a common x-axis 132 indicative of elapsed time and a common amplitude y-axis 134. The seek occurs over a duration of time 0 to time $t_0$.

A position (X) curve 136 shows the displacement of the head 112 from an initial position $X_1$ to a final position 0. A velocity (V) curve 138 shows the associated velocity of the head 112 as the head is displaced to the final position. An acceleration (force, F) curve 140 shows the corresponding force applied to the actuator coil 114 to effect the seek to the final position, and a jerk (J) curve 142 represents the change in force over time during the seek.

As will be recognized, each of the position, velocity, force and jerk are related and one can be derived from another either through integration or by taking the derivative with respect to time. For example, taking the derivative of position X provides velocity V (i.e., V=dX/dt); integrating jerk J provides force (i.e., F=∫J dt), etc. Based on these interrelationships, an initial family of profiles suitable for a normalized seek length can be derived using the following three constraints:

$$F(0) = F(t_0) = 0; \qquad (1)$$

$$\int_0^{t_0} F(\tau)\,d\tau = 0;$$

$$\int_0^{t_0} dy \int_0^y F(\tau)\,d\tau = S$$

The first constraint is that both the starting and ending force should be equal to zero. The second constraint is that the final velocity of the head should be zero. The third constraint is that the final position of the head should be equal to the desired displacement S (S is equal to the distance from $X_1$ to 0). Because jerk is the derivative of force, the constraints of equation (1) can be rewritten in terms of jerk (dF/dt) as follows:

$$\int_0^{t_0} \frac{dF}{dt}(\tau)\,d\tau = 0; \qquad (2)$$

$$\int_0^{t_0} dy \int_0^y \frac{dF}{dt}(\tau)\,d\tau = 0;$$

$$\int_0^{t_0} dy \int_0^y dz \int_0^z \frac{dF}{dt}(\tau)\,d\tau = S$$

As the system of (2) involves three equations, the following second order polynomial representation can be used to meet each of the stated constraints:

$$J = \frac{dF}{dt} = at^2 + bt + c \qquad (3)$$

It can be readily shown that solving (2) and (3) provides:

$$J = \frac{dF}{dt} = \frac{60S}{t_0^3}\left[6\left(\frac{t}{t_0}\right)^2 - 6\left(\frac{t}{t_0}\right) + 1\right] \qquad (4)$$

and $$F = \frac{60S\left[2\left(\frac{t}{t_0}\right)^3 - 3\left(\frac{t}{t_0}\right)^2 + \frac{t}{t_0}\right]}{t_0^2} \qquad (5)$$

The force profile of (5) has a minimum number of zeros and thus provides smooth operation (reduced jerk) over the seek. However, this methodology does not take into account the effects of bemf and coil inductance. To do so, additional constraints should be added to the system, as shown by FIG. 4.

Figure 4:
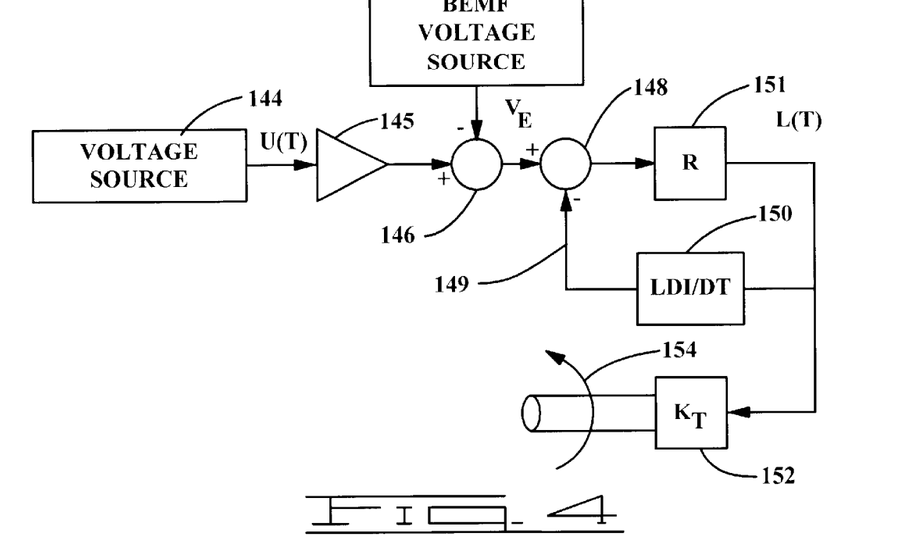
FIG. 4 is a schematic diagram generally illustrating the effects of coil inductance and back electromotive force (bemf) in the actuator coil used to move the head.

FIG. 4 provides a schematic representation of relevant portions of the servo circuit 120 of FIG. 2. Block 144 is a voltage source which outputs a controllable voltage U(t) to an amplifier 145. The amplified voltage from the amplifier 145 is combined at a summing junction 146 with a bemf voltage $V_E$ from a bemf voltage source 147. The bemf voltage $V_E$ is generated in response to movement of the coil 114 within the magnetic circuit of the VCM 116.

The output voltage from the summing junction 146, which is the difference between the amplified voltage from the amplifier 145 and the bemf voltage $V_E$, is further combined at a summing junction 148 with a voltage on path 149. The voltage on path 149 constitutes the time rate of change of coil current $I_{COIL}$ operating through a coil inductance L, as represented by block 150.

The voltage output by the summing junction 148 is applied to a coil resistance R, as represented by block 151. The resulting coil current $I_{COIL}$ (also referred to as "I(t)") is applied to the coil 114 (FIG. 1) and operates in relation to a motor torque constant $K_T$ at block 152 to generate motor torque, as represented at block 154.

The source voltage U(t) determines the coil current I(t) in accordance with the following relation:

$$U(t) = I(t)R + V_E + L\frac{dI(t)}{dt} \qquad (6)$$

$$U(t) = I(t)R + K_{BEMF} K_T \int I(t) + L\frac{dI(t)}{dt}$$

$$\frac{U(t)}{R} = I(t) + \frac{K_{BEMF} K_T}{R}\int I(t) + \frac{L}{R}\frac{dI(t)}{dt}$$

where R is the resistance from block 151 (FIG. 4), L is the inductance from block 150, $K_T$ is the motor torque constant of block 152, and $K_{BEMF}$ is a constant relating the bemf voltage $V_E$ (block 147) to the integral of coil current I(t). Setting $\alpha = (K_{BEMF} K_T)/R$ and setting $\beta = L/R$, equation (6) becomes:

$$\frac{U(t)}{R} = I(t) + \alpha\int I(t) + \beta\frac{dI(t)}{dt} \qquad (7)$$

Rearranging terms provides:

$$I(t) = \frac{U(t)}{R} - \alpha\int I(t) - \beta\frac{dI(t)}{dt} \qquad (8)$$

Equation (8) is the integro-differential equation relative to the unknown value I(t). Since the parameters $\alpha$ and $\beta$ are relatively small (i.e., $1 \gg \alpha \gg \beta$), and setting D=U(t)/R, expansion techniques can be applied to equation (8) so that the lowest order of approximation provides:

$$I(t) = \frac{U(t)}{R} - \alpha\int\frac{U(t)}{R}dt - \frac{\beta}{R}\frac{dU(t)}{dt} = D - \alpha\int D\,dt - \beta\frac{dD}{dt} \qquad (9)$$

Using a higher order of expansion and taking into account that $\alpha \gg \beta$, using three orders of $\alpha$, one order of $\beta$, and using mixed terms $2\alpha\beta$ and $\alpha^2\beta$, and inserting I(t) from equation (9) into the right hand side of equation (8), the relation can be approximated as:

$$I(t) = D - \alpha\int D\,dt + \alpha^2\int\int D\,dt + 2\alpha\beta D - \beta\frac{dD}{dt} - \qquad (10)$$

$$\alpha^3\int\int\int D\,dt - \alpha^2\beta\int D\,dt$$

This expansion of I(t) can be used to find dI(t)/dt for use in the equations of (2) listed above (substituting current for force). These equations will contain the multiple integrals with the same low limit of integration and the unknown variable will be dD/dt.

These calculations can be simplified by using the formula for the multiple integrals from (2):

$$\int_p^x dt_{n-1}\int_p^{t_{n-1}} dt_{n-2}\ldots\int_p^{t_1} f(t)\,dt = \frac{1}{(n-1)!}\int_0^x (x-t)^{n-1} f(t)\,dt \qquad (11)$$

Applying the formula of (11) to the system of three equations of (2) provides the following system description:

$$\int_0^{\tau_0} \frac{dD}{dt}(\tau) G1(\alpha, \beta, t, t_0) d\tau = 0; \quad (12)$$

$$\int_0^{\tau_0} \frac{dD}{dt}(\tau) G2(\alpha, \beta, t, t_0) d\tau = 0;$$

$$\int_0^{\tau_0} \frac{dD}{dt}(\tau) G3(\alpha, \beta, t, t_0) d\tau = S$$

The system of (11) includes derivatives of D (which corresponds to the applied control voltage U(t)). The functions G1, G2 and G3 have the following form with the chosen level of accuracy:

$$G1 = -\alpha(1 + \alpha\beta)(t_0 - t) + \frac{\alpha^2(t - t_0)^2}{2} - \frac{\alpha^3(t_0 - t)^3}{6}, \quad (13)$$

$$G2 = (1 + 2\alpha\beta)(t - t_0) - \frac{\alpha(1 + \alpha\beta)(t - t_0)^2}{2} +$$
$$\frac{\alpha^2(t_0 - t)^3}{6} - \frac{\alpha^3(t - t_0)^4}{24} - \beta,$$

$$G3 = \frac{(t - t_0)^2(1 + 2\alpha\beta)}{2} - \frac{\alpha(1 + \alpha\beta)(t_0 - t)^3}{6} +$$
$$\frac{\alpha^2(t - t_0)^4}{24} - \frac{\alpha^3(t_0 - t)^5}{120} \Big/ 120 - \beta(t_0 - t)$$

These functions allow for the simple integration of the system of (12) with the polynomial expression for dD/dt with 3 unknown variables as follows:

$$\frac{dD}{dt} = At^2 + Bt + C \quad (14)$$

After integrating, the variables A, B and C can be easily determined. Once the jerk profile dD/dt is identified, the desired control voltage U(t) can be obtained through integration of dD/dt. U(t) can be used to obtain the coil current I(t) from equation (10). Velocity and position profiles can then be obtained by integrating I(t). A suitable software program such as Matlab®, commercially available from The Mathworks, Inc., Natick, Mass., USA, can be used to perform the necessary calculations and simulations.

Figure 5:
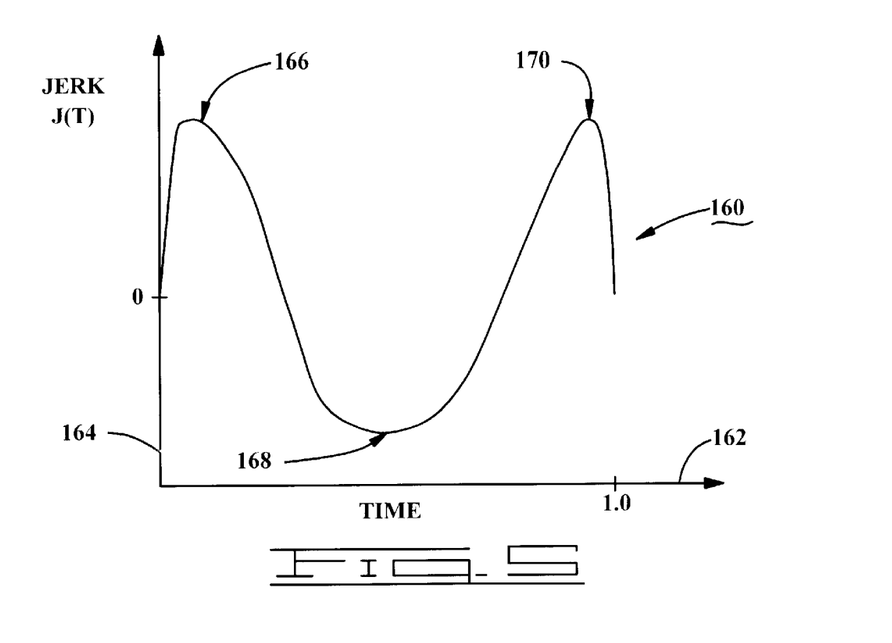
FIG. 5 is a graphical representation of a jerk profile that takes into account the effects of coil inductance and bemf shown in FIG. 4.

It will now be understood that the system of (12) enables the generation of a base series of jerk, current, control voltage, velocity and position profiles that are optimal for a normalized seek length and take into account coil inductance and bemf. An exemplary base jerk profile obtained from the system of (12) is shown in FIG. 5 at 160 (plotted against an elapsed time x-axis 162 and amplitude y-axis 164). The jerk profile 160 has maximum amplitude values (indicated at peaks 166, 168 and 170). This assures smoothest operation and minimal excitation of system resonances across the board.

Figure 6:
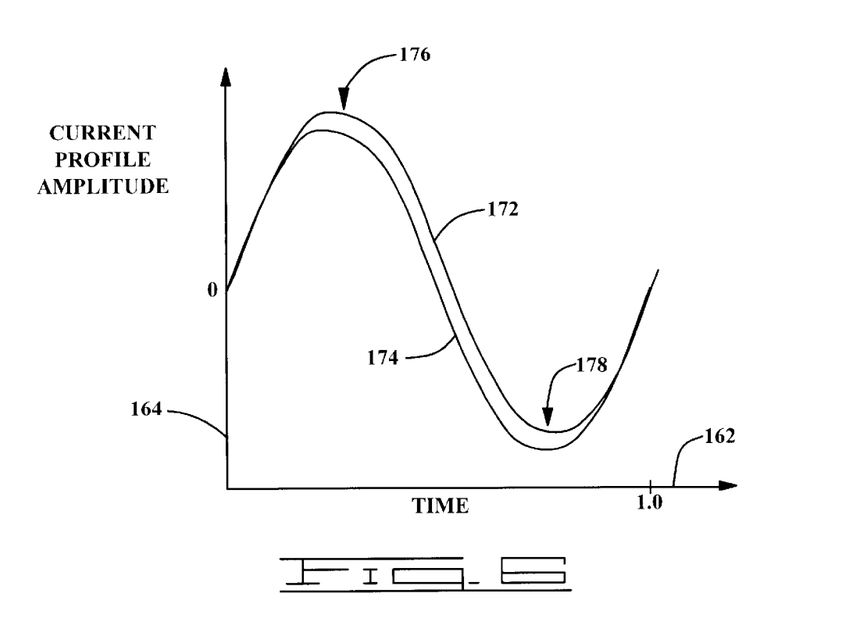
FIG. 6 shows a corresponding current profile determined from the jerk profile of FIG. 5 as well as a second current profile that does not take into account bemf and coil inductance.

A corresponding base current profile is shown at 172 in FIG. 6. The current profile represents the current I(t) within the coil 114 and is obtained from equation (10). For comparison purposes, FIG. 6 also shows a current profile 174 obtained using the equations of (2) which do not take into account VCM bemf and coil inductance.

While the system of (12) provides a set of optimal control profiles from a minimal jerk standpoint, the trajectories obtained therefrom may be inadequate for direct use due to other system constraints. For example, applying the maximum available magnitudes of current at positive and negative current peaks 176, 178 (FIG. 6) may not allow completion of the seek in a suitably short amount of time. Stated another way, it may be desirable to increase the time at which the current remains at maximal values in order to shorten the time required to complete the seek.

Because maximal current corresponds to a derivative of zero, mathematically it follows that the corresponding jerk profile will be zero at such times. A straightforward way to accomplish this is to multiply the second order polynomial representation of the jerk (equation (14)) by a notch function having a value of nominally 0 at times of interest and a value of nominally 1 at other times. Representing this function as W(t), the jerk formulation can be rewritten as follows:

$$\frac{dD}{dt} = (At^2 + Bt + C)W(t) \quad (15)$$

A suitable form for the notch function W(t) is:

$$W(t) = 1 - e^{(-n(t - t^*))^{2m}} \quad (16)$$

where t* is the time near zero jerk, n and m are constants that determine the length and shape of the notch near t*. Several different functions of W(t) can be provided at different moments of t* to provide the desired jerk characteristics. Of course, the notch function W(t) can take other suitable forms besides that shown in equation (16).

Figure 7:
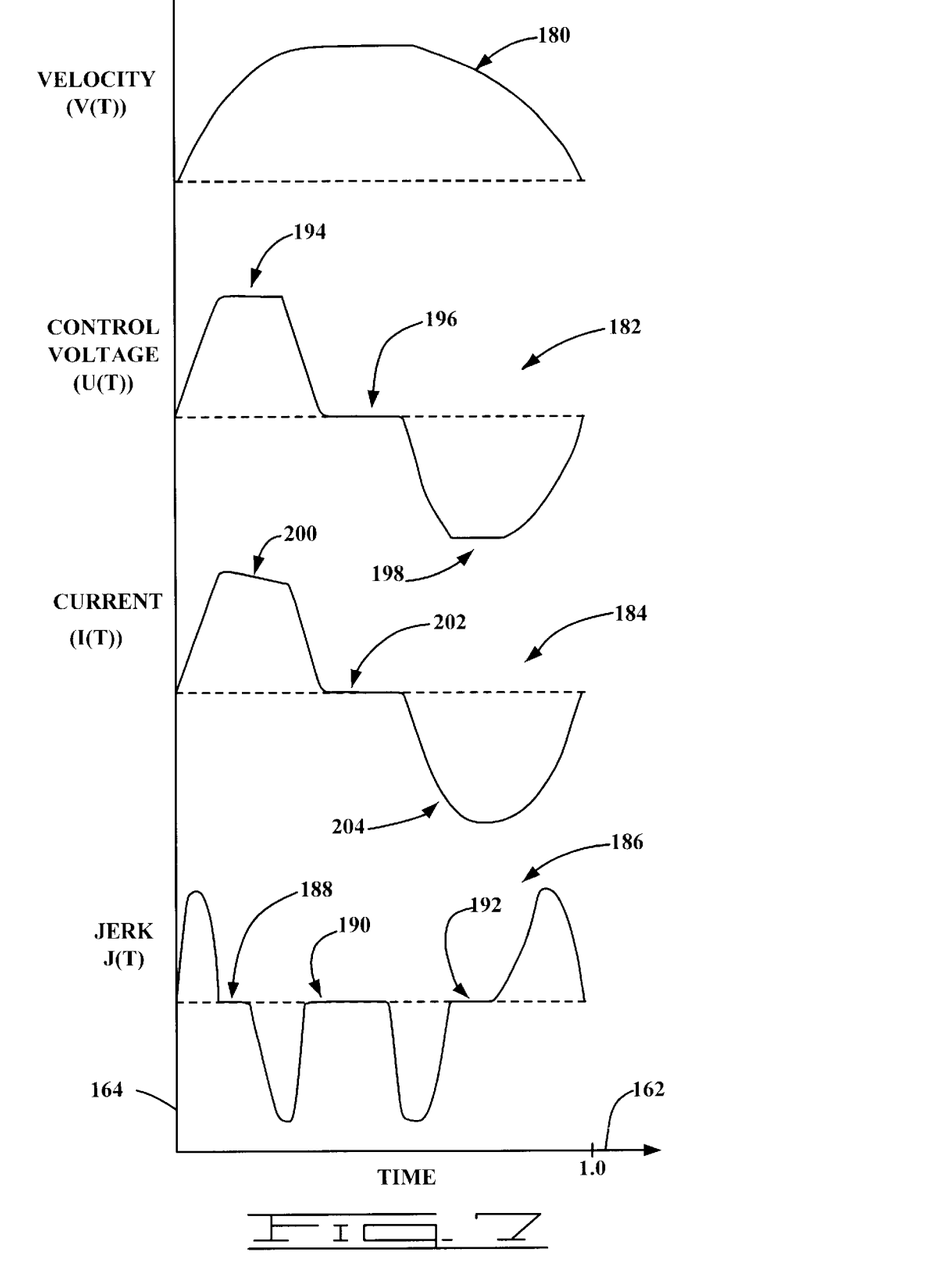
FIG. 7 provides a series of normalized control profiles obtained from a modified jerk profile obtained by the application of notch functions to the jerk profile of FIG. 5.

By way of illustration, FIG. 7 shows a series of normalized control profiles that are modified from the base series of control profiles determined above. These include a velocity (V(t)) profile 180, a control source voltage (U(t)) profile 182, a coil current (I(t)) profile 184 and a jerk (J(t)) profile 186 (J(t)=dD/dt). Notch functions $W_1(t)$, $W_2(t)$ and $W_3(t)$ have been added to the jerk profile J(t) as follows:

$$J(t) = \frac{dD}{dt} = (At^2 + Bt + C)W_1(t)W_2(t)W_3(t) \quad (17)$$

The notch functions $W_1(t)$, $W_2(t)$ and $W_3(t)$ servo to add zero portions 188, 190, 192 in the jerk profile curve 186 in FIG. 7, and result in the portions 194, 196 and 198 in the voltage profile 182 and the portions 200, 202 and 204 in the current profile 184. At this point, the series of control profiles provides optimum control with minimal broad spectrum excitation of resonances.

The next step in the process is to account for specific resonances associated with the mechanical structure of the system deemed to be of particular concern with regard to the bandwidth of the servo system. These resonances can be empirically determined from evaluation of an engineering prototype or from computer modeling. Such resonances are induced by various vibrational modes (head/flexure translation, rigid actuator arm translation, ball bearing artifacts, etc.) and may have example frequency values of about 1200 Hz, 2300 Hz, 5800 Hz, etc.

Figure 8:
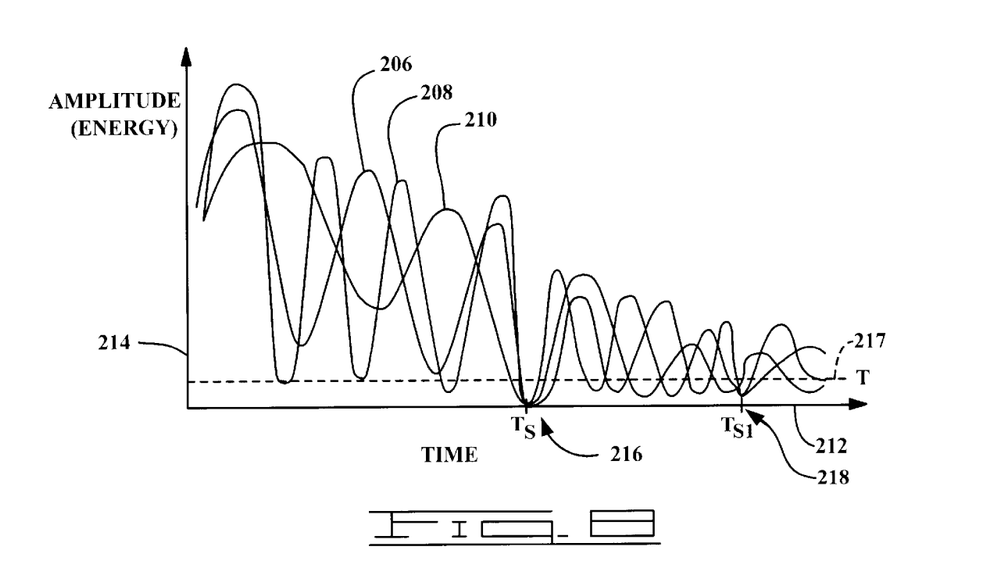
FIG. 8 graphically represents excitation energy for a number of resonant frequencies of interest versus time.

For a given resonant frequency $f_1$, an energy function $A_1$ can be defined as follows:

$$A_1 = \left[ \int_0^{\tau_0} J(t) \cos\omega_1(t - \tau) d\tau \right]^2 \quad (18)$$

where $\omega_1 = 2\pi f_1$ and J(t) is the modified jerk profile, such as shown by equation (17). Preferably, each of a set of energy functions An for the selected resonant frequencies of interest are determined and plotted on a common set of axes, such as shown by curves 206, 208 and 210 against time x-axis 212 and amplitude (energy) y-axis 214 in FIG. 8. The first minimum of the curves 206, 208 and 210 is identified at point 216, which corresponds to an elapsed time $t_S$. Stated another way, the point 216 is the first location at which the combined energies of the various curves 206, 208 and 210 fall below a threshold T (such as generally indicated at 217).

For reference, an exemplary value of ts might be on the order of about 4 milliseconds. It follows that if the normalized set of control profiles of FIG. 8 are carried out so that the time scale is from t=0 to t=$t_S$, minimal excitation of the selected resonant frequencies of interest will occur during the seek. This is true regardless of the actual displacement of the head during the seek.

The total displacement S (in millimeters or tracks) will be determined in response to the setting of various seek parameters, such as the maximum values of the control voltage U(t) (i.e., magnitudes of portions 194, 198 of curve 182 in FIG. 7), the duration of time at which the head 112 coasts at maximum velocity between the acceleration and deceleration phases (i.e., the length of portion 196 of curve 182 in FIG. 7), and so on.

A table of profiles can now be constructed for a class of seeks of incrementally larger displacement and all having durations near $t_S$. In a preferred embodiment, the profiles are characterized as control voltage profiles which are used to control the output of the control voltage U(t) during subsequent seeks. In another preferred embodiment, the profiles are characterized as velocity profiles which are then used in closed loop fashion during subsequent seeks (i.e., the velocity of the head is repetitively measured and the source voltage is adjusted in relation to velocity error to cause the head to follow the velocity profile to the target track). Simulations are preferably performed in an iterative fashion to arrive at optimal control profiles for each seek displacement length.

With reference again to FIG. 8, it will be noted that the seek time $t_S$ identified by the first minimum of the An energy curves 206, 208, 210 will likely only accommodate a number of all desired seek displacement lengths. That is, while a number of seeks can be carried out within the allotted time of $t_S$, there will be upper limits on the amount of current that can be supplied to the VCM as well as a maximum safe velocity that can be achieved during the seek. Under these constraints, the time $t_S$ simply does not provide enough time to move the head to all possible target tracks.

As a result, displacements to tracks that cannot be reached within the time constraint $t_S$ will require selection of a new time constraint. To continue suppression of the resonant frequencies of interest, the next time constraint is preferably selected at a next occurrence of minimum An energy values, such as at time $t_{S1}$ at point 218 in FIG. 8. For reference, time $t_{S1}$ might have an exemplary value of about 6 milliseconds. Thus, additional table values are constructed for all seek displacement lengths that can be carried out in a time of about $t_{S1}$ but not within a time of about $t_S$. This process continues until all seek displacement lengths are accounted for within the drive 100.

Figure 9:
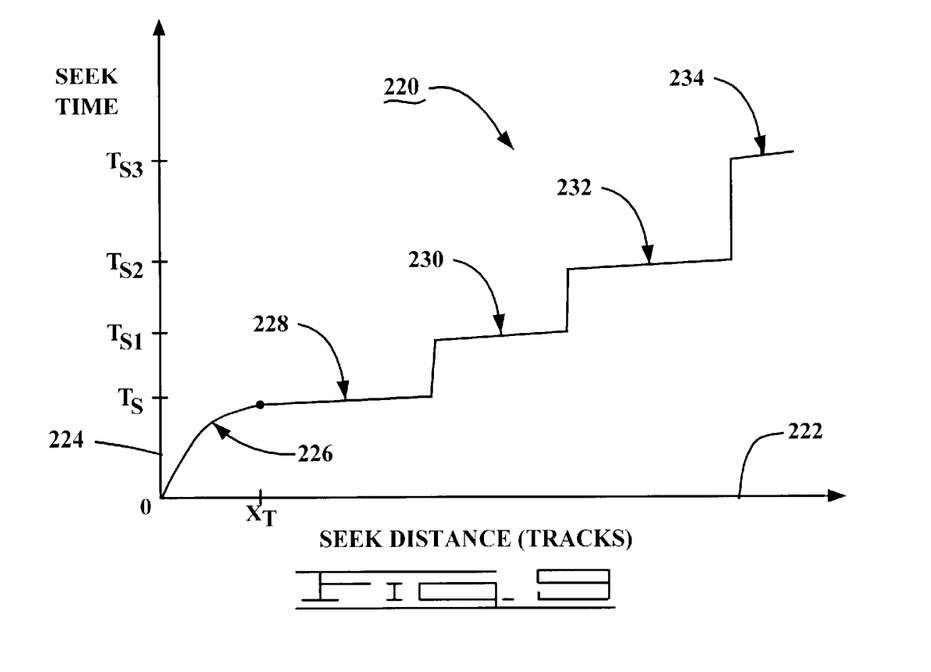
FIG. 9 shows a plot of seek distance versus elapsed seek time for a number of seeks of various displacement lengths, with each grouping of seeks having an elapsed seek time near a time scale value selected from the graph of FIG. 8.

FIG. 9 illustrates the relationship of seek duration and seek displacement using this methodology. A seek duration curve 220 is plotted against an x-axis 222 indicative of distance (seek displacement) and a y-axis 224 indicative of elapsed time (seek duration). Lead-in portion 226 illustrates the seek times achieved using a conventional short-seek methodology (such as model reference seeks or position controlled seeks) for seek durations up to a transition position $X_T$ (for example, up to 50 tracks). Seek displacement lengths beyond the transition position $X_T$ are preferably carried out using the foregoing methodology.

Unlike prior art systems which have a parabolic continuous relationship between seek length and seek duration, a seek duration curve 220 has a "stair step" discontinuous configuration. Each grouping of seeks within the seek duration curve 220 is carried out near each of the time scale values obtained from the analysis associated with FIG. 8; thus, the seeks identified at portion 228 all have a duration near $t_S$, the seeks identified at portion 230 have a duration near $t_{S1}$, the seeks identified at portion 232 have a duration near $t_{S2}$, and the seeks identified at portion 234 have a duration near $t_{S3}$. The actual number of steps in the seek duration curve 220 will depend on a number of factors, including the characteristics of the selected resonances, so that any number of different time scales can be used depending on the configuration of a given application.

Figure 10:
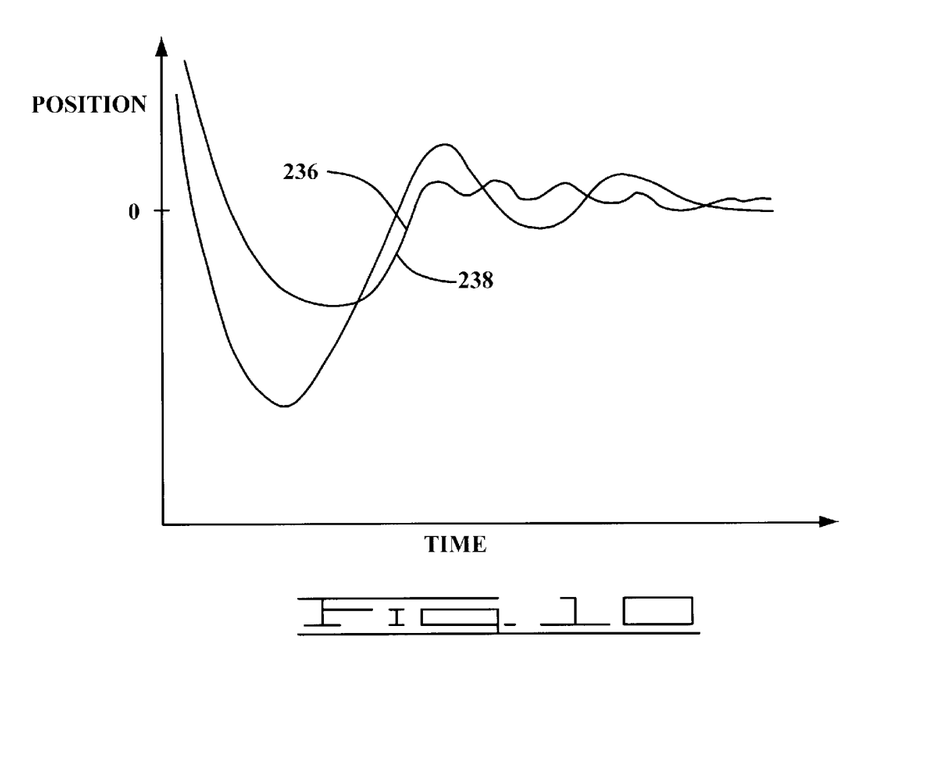
FIG. 10 shows improvements in settling characteristics achieved using seeks carried out in accordance with preferred embodiments of the present invention.

Grouping the seeks about these time scale values will result in minimal excitation of the selected resonances of interest, leading to improved settling performance once the target track is reached, as indicated by FIG. 10. Curve 236 generally represents a typical trajectory of a head using advanced prior art control techniques as the head settles onto a destination position 0. Curve 238 generally represents a typical trajectory of a head using the methodology presented above.

From FIG. 10 it can be seen that significant improvements in settling performance are achieved using the disclosed methodology. The small amplitude oscillations present in curve 238 were determined to be due to uncontrollable windage effects (turbulence) in the airflow impinging the head. Thus, when properly configured the disclosed methodology provides substantially optimum settle performance and substantially no excitation of resonances within the mechanical actuator system.

Figure 11:
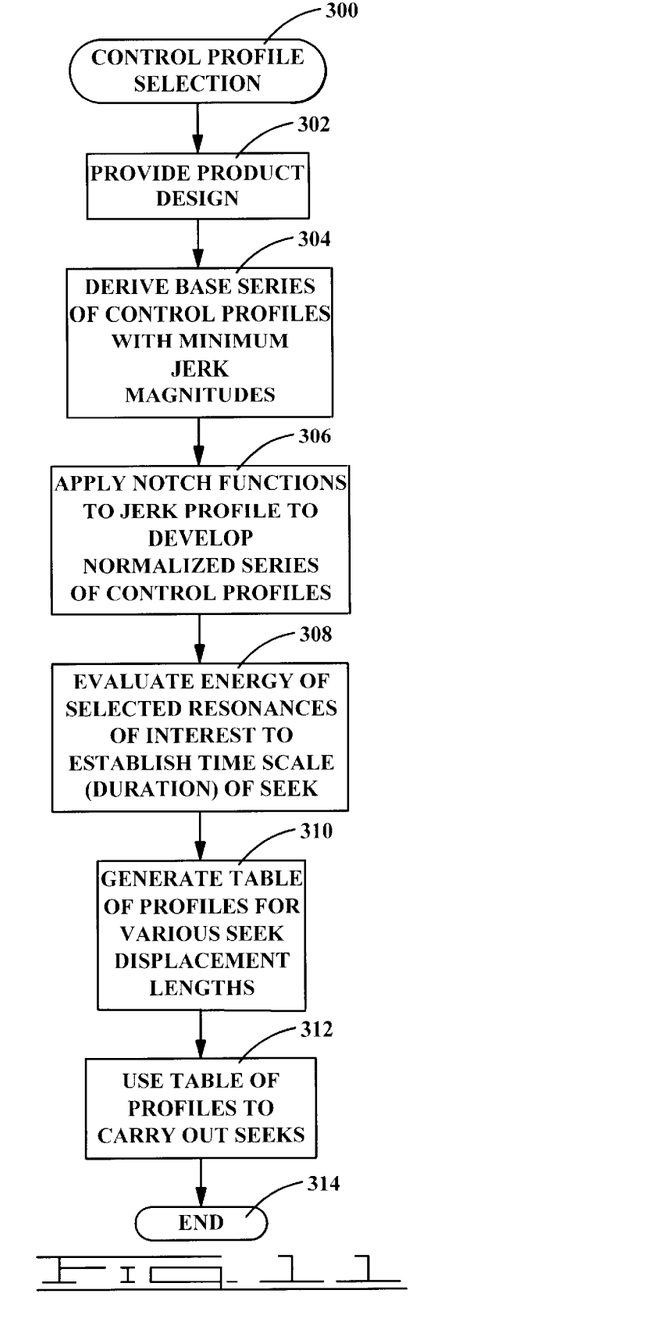
FIG. 11 is a CONTROL PROFILE SELECTION routine, generally illustrative of various steps carried out in accordance with preferred embodiments of the present invention.

To summarize the foregoing methodology, FIG. 11 shows a CONTROL PROFILE SELECTION routine 300, illustrative of steps carried out in accordance with preferred embodiments of the present invention to develop control profiles for various seek displacement lengths within the disc drive 100. Of course, the following methodology can also readily be used to establish control profiles for other types of control objects such as articulated robot arms.

A product design model is provided at step 302. This design can be a physical prototype (engineering model) or can exist as a computer model of the system. A base series of control profiles with minimal jerk magnitudes is determined at step 304. Preferably, this is carried out using the system of equation (12) so that back emf and coil inductance are included in the system description; however, it is contemplated that in certain circumstances it may be desirable to generate the base series of control profiles using the system of equation (2) (which does not take into account back emf and coil inductance).

Step 306 involves evaluating the base series of profiles and applying notch functions to the jerk profile as desired to increase the time that maximal current is applied to the actuator coil (as described by equation (17)) and hence, shorten the overall time required for the seek access operation. This will result in a series of normalized control profiles such as exemplified by FIG. 7.

Step 308 involves identifying and evaluating selected resonant frequencies of interest and selecting a number of time scales for the control profiles of step 306. This preferably involves calculating energy functions as set forth by equation (18) for each of the frequencies and plotting the results as shown in FIG. 8 for graphical determination of the respective minimum points; alternatively, the energy functions can be summed using suitable computational software to calculate the minimum points.

Once the time scale values are selected, the routine continues to step 310 where a table of profiles is generated for each grouping of seeks having nominally the same time scale duration and different displacement lengths (as shown by FIG. 9). Thereafter, during normal operation the table of profiles is used to identify and apply the appropriate set of control profiles to move the selected head 114 the desired seek displacement distance, step 312. The routine then ends at 314.

It will now be appreciated that the present invention (as embodied herein and as claimed below) is directed to a method for positioning a control object, such as a head (such as 112) supported by an actuator (such as 114) in a disc drive (such as 100).

In accordance with preferred embodiments, a base series of control profiles is first selected to describe jerk, acceleration, velocity and displacement of the control object from an initial position to a final position (such as by step 304 in FIG. 11). The base control profiles include a continuous base jerk profile (such as profile 160) configured to suppress excitation of mechanical resonances in the control object.

At least one notch function is applied to the base jerk profile to provide a modified jerk profile (such as profile 186) having a value of zero at selected times during which maximum current is to be applied to control the trajectory of the control object. The modified jerk profile is used to provide a normalized series of control profiles that describe acceleration, velocity and displacement of the control object (such as by step 306).

Thereafter, a seek operation is performed to displace the control object from the initial position to the final position in relation to the normalized series of control profiles (such as by step 312).

Preferably, the base jerk profile is further configured to account for back electromagnetic force (bemf) generated during displacement of the control object. The base jerk profile is preferably expressed as a second order polynomial $At^2+Bt+C$ where t represents elapsed time and coefficients A, B and C are determined in relation to desired initial and final states of the control object.

The notch function is preferably characterized as a function $W(t)$ and the modified jerk profile is expressed as a relationship $(At^2+Bt+C)(W(t))$. A preferred form for $W(t)$ is in accordance with the relationship $1-e^{(-n(l-l^*))^{2m}}$ where $t^*$ is a location of a notch provided in the modified jerk profile by the notch function so that the modified jerk profile has a zero value at locations near $t^*$, and where n and m are constants that determine length and shape of the notch about $t^*$. Additional functions $W(t)$ can be advantageously added to provide additional notches to the modified jerk profile as desired.

The normalized control profiles are preferably used to control the displacement of the control object by identifying a number of resonant frequencies of the control object, and evaluating the excitation energy of each of the number of resonant frequencies for a sequence of different seek operations carried out using the normalized series of control profiles and having different elapsed time durations (such as by step 308). A time scale value is selected as a time at which a combination of the excitation energies of each of the number of resonant frequencies is below a selected threshold (such as 217), and a seek operation is performed to move the control object from the initial position to the target position so that the elapsed time during the seek operation is nominally equal to the time scale value (such as by step 310).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application for the control profile selection methodology while maintaining the same functionality without departing from the spirit and scope of the present invention.

In addition, although the embodiments described herein are directed to a disc drive data handling device, it will be appreciated by those skilled in the art that the methodology can readily be adapted to other systems in which a control object is moved from an initial to a final state without departing from the spirit and scope of the claimed invention.

What is claimed is:

1. A method for positioning a control object, comprising:
   selecting a base series of control profiles that describe jerk, acceleration, velocity and displacement of the control object from an initial position to a final position, the control profiles including a continuous base jerk profile configured to suppress excitation of mechanical resonances in the control object;
   applying at least one notch function to the base jerk profile to provide a modified jerk profile having a value of zero at selected times during which maximum current is to be applied to control the trajectory of the control object;
   using the modified jerk profile to provide a normalized series of control profiles that describe acceleration, velocity and displacement of the control object; and
   performing a seek operation to displace the control object in relation to the normalized series of control profiles.

2. The method of claim 1, wherein the continuous base jerk profile is further configured to account for back electromagnetic force (bemf) generated during displacement of the control object.

3. The method of claim 1, wherein the continuous base jerk profile is expressed as a relationship $At^2+Bt+C$ where t represents elapsed time and coefficients A, B and C are determined in relation to desired initial and final states of the control object.

4. The method of claim 3, wherein at least one notch function is characterized as a function $W(t)$ and wherein the modified jerk profile is expressed as a relationship $(At^2+Bt+C)(W(t))$.

5. The method of claim 4, wherein the function $W(t)$ is expressed as a relationship $1-e^{(-n(l-l^*))^{2m}}$ where $t^*$ is a location of a notch provided in the modified jerk profile by the notch function so that the modified jerk profile has a zero value at locations near $t^*$, and where n and m are constants that determine length and shape of the notch about $t^*$.

6. The method of claim 1, wherein the displacing step comprises:
   identifying a number of resonant frequencies of the control object;
   evaluating excitation energy of each of the number of resonant frequencies for a sequence of different seek operations carried out using the normalized series of control profiles and having different elapsed time durations;
   selecting a time scale value as a time at which a combination of the excitation energies of each of the number of resonant frequencies is below a selected threshold; and performing the seek operation to move the control object from the initial position to the target position so that the elapsed time during the seek operation is nominally equal to the time scale value.

7. The method of claim 6, wherein the distance between the initial position and the final position is characterized as a first displacement length, and wherein the method further comprises:

identifying a second displacement length different from the first displacement length; and performing a second seek operation to move the control object the second displacement length in accordance with the normalized series of control profiles so that the elapsed time during the second seek operation is also nominally equal to the time scale value.

8. The method of claim 1, wherein the control object is a data transducing head in a disc drive data handling device.

9. In a disc drive data handling device of the type having a controllably positionable actuator which supports a data transducing head adjacent a data recording surface on which concentric data tracks are defined, a method for carrying out a seek in which the head is moved from an initial track to a destination track, comprising:

generating a series of normalized control profiles that describe jerk, acceleration, velocity and displacement of the head for a seek over a normalized displacement distance and over a normalized elapsed time, the normalized control profiles selected to suppress excitation of mechanical resonances in the head during the seek;

identifying a number of resonant frequencies of the actuator;

evaluating excitation energy of each of the number of resonant frequencies for a sequence of different seeks having different elapsed time durations and carried out using the normalized control profiles;

selecting a time scale value as a time at which a combination of the excitation energies of the number of resonant frequencies is below a selected threshold; and performing a seek to move the head from the initial track to the destination track in relation to the normalized control profiles, wherein the elapsed time of the seek is set equal to the time scale value.

10. The method of claim 9, wherein the distance between the initial track and the destination track is characterized as a first seek length, and wherein the method further comprises a step of performing a second seek over a second seek length different from the first seek length in accordance with the normalized control profiles, wherein the elapsed time of the second seek is also set equal to the time scale value.

11. The method of claim 9, further comprising:

generating a table of control profile values to describe a group of seeks each having incrementally different lengths; and performing each of the seeks in the group of seeks over an elapsed time that is nominally equal to the time scale value.

12. The method of claim 10, wherein the group of seeks is characterized as a first group of seeks and the time scale value is characterized as a first time scale value, and wherein the method further comprises:

identifying a second group of seeks each having incrementally different lengths greater than the lengths of the first group of seeks;

selecting a second time scale value greater than the first time scale value as a time at which a combination of the excitation energies of the number of resonant frequencies is below the selected threshold;

generating a table of control profile values to describe the second group of seeks; and performing each of the seeks in the second group of seeks over an elapsed time that is nominally equal to the second time scale value.

13. The method of claim 9, wherein the generating step comprises:

selecting a base series of control profiles that describe jerk, acceleration, velocity and displacement of the head from the initial track to the destination track, the control profiles including a continuous base jerk profile configured to suppress excitation of mechanical resonances in the actuator;

applying at least one notch function to the base jerk profile to provide a modified jerk profile having a value of zero at selected times during which maximum current is to be applied to control the trajectory of the head;

using the modified jerk profile to provide the normalized series of control profiles.

14. The method of claim 13, wherein the continuous base jerk profile is further configured to account for back electromagnetic force (bemf) generated during displacement of the control object.

15. The method of claim 13, wherein the continuous base jerk profile is expressed as a relationship $At^2+Bt+C$ where t represents elapsed time and coefficients A, B and C are determined in relation to desired initial and final states of the head.

16. The method of claim 15, wherein the at least one notch function is characterized as a function W(t) and wherein the modified jerk profile is expressed as a relationship $(At^2+Bt+C)(W(t))$.

17. The method of claim 16, wherein the function W(t) is expressed as a relationship $1-e^{(-n(t-t^*))^{2m}}$ where $t^*$ is a location of a notch provided in the modified jerk profile by the notch function so that the modified jerk profile has a zero value at locations near $t^*$, and where n and m are constants that determine length and shape of the notch about $t^*$.

* * * * *